(12) United States Patent
Fujio (10) Patent No.: US 10,294,033 B2
(45) Date of Patent: May 21, 2019

(54) CONVEYOR APPARATUS

(71) Applicant: DAIFUKU CO., LTD., Osaka-shi, Osaka (JP)

(72) Inventor: Yoshihiko Fujio, Shiga (JP)

(73) Assignee: DAIFUKU CO., LTD., Osaka-shi, Osaka (JP)

( * ) Notice: Subject to any disclaimer, the term of this patent is extended or adjusted under 35 U.S.C. 154(b) by 0 days.

(21) Appl. No.: 16/077,629

(22) PCT Filed: Feb. 13, 2017

(86) PCT No.: PCT/JP2017/005096
§ 371 (c)(1),
(2) Date: Aug. 13, 2018

(87) PCT Pub. No.: WO2017/141864
PCT Pub. Date: Aug. 24, 2017

(65) Prior Publication Data
US 2019/0055089 A1 Feb. 21, 2019

(30) Foreign Application Priority Data
Feb. 19, 2016 (JP) ................................ 2016-029438

(51) Int. Cl.
*B65G 17/32* (2006.01)
*B65G 47/38* (2006.01)

(52) U.S. Cl.
CPC ............. *B65G 17/32* (2013.01); *B65G 47/38* (2013.01)

(58) Field of Classification Search
CPC ................................ B65G 17/32; B65G 47/38

USPC ................................ 198/370.01, 370.04, 822
See application file for complete search history.

(56) References Cited

U.S. PATENT DOCUMENTS

| 3,231,066 A | * | 1/1966 | Harrison | B07C 3/082 198/370.04 |
| 5,667,054 A | * | 9/1997 | van den Goor | B65G 17/066 198/370.04 |
| 5,746,301 A | * | 5/1998 | Maier | B65G 47/962 198/370.04 |
| 6,050,390 A | * | 4/2000 | Fortenbery | B65G 11/023 193/33 |
| 6,135,262 A | * | 10/2000 | Polling | B65G 47/962 198/370.04 |
| 6,152,280 A |   | 11/2000 | Bruun | |

(Continued)

FOREIGN PATENT DOCUMENTS

| JP | 2002-520239 | 7/2002 |
| WO | WO 00/02802 | 1/2000 |

OTHER PUBLICATIONS

International Search Report from corresponding International Patent Application No. PCT/JP17/05096, dated May 16, 2017.

*Primary Examiner* — Douglas A Hess
(74) *Attorney, Agent, or Firm* — Kusner & Jaffe (57) ABSTRACT

A conveyor apparatus that conveys articles supported by a plurality of arranged article supports, the conveyor apparatus including infilling members, each being disposed between the article supports. In one embodiment, the infilling member includes a plate contact part in contact with the article support such that the upward curvature of the plate contact part is larger than that of the tray contact part of the article support corresponding to the plate contact part.

4 Claims, 5 Drawing Sheets

(56) References Cited

U.S. PATENT DOCUMENTS

| | | | | |
|---|---|---|---|---|
| 6,360,868 B1* | 3/2002 | Arlt | ............... | B65G 17/345 |
| | | | | 198/370.06 |
| 6,607,066 B1* | 8/2003 | Andersen | ............ | B65G 17/345 |
| | | | | 198/370.04 |
| 6,814,218 B2* | 11/2004 | Nishihara | ............ | B65G 35/06 |
| | | | | 198/370.04 |
| 7,337,892 B2* | 3/2008 | Groot | ............... | B65G 17/066 |
| | | | | 198/369.3 |
| 7,431,164 B2* | 10/2008 | Groot | ............... | B65G 47/962 |
| | | | | 198/370.04 |
| 9,902,569 B2* | 2/2018 | Lykkegaard | ........ | B65G 47/962 |

* cited by examiner

CONVEYOR APPARATUS

FIELD OF THE INVENTION

The present invention relates to a conveyor apparatus for transporting articles, and particularly relates to a conveyor apparatus for transporting articles placed on article supports such as a tray.

BACKGROUND OF THE INVENTION

Conveyor apparatuses are used in some facilities where a plurality of articles need to be conveyed from an origin to destinations, for example, in the case of an airport where passenger's baggage is conveyed from an airport check-in area to an area for loading the baggage into an airplane that is scheduled to board passengers. Such a conveyor apparatus conveys articles on trays (article supports) traveling on a conveying path and inclines the trays at positions for the placed articles (inclines the trays laterally with respect to the conveying direction), so that the articles are discharged into chutes disposed along the conveying path and connected to the destinations.

In such a conveyor apparatus, a clearance is left between the adjacent article supports, that is, between the trays, so that part (e.g., the shoulder strap of a bag) of baggage (article) may be dropped or caught in the clearance. In order to solve the problem, as described in WO00/02802 ("Patent Literature 1"), a cover member for covering a clearance (gap) may be prepared.

A cover member described in Patent Literature 1 is directly connected to the bottom of an article support member (tray) via a pivot or a pin and thus the cover member is inclined with the article support member being inclined.

TECHNICAL PROBLEM

In this configuration, the cover member described in Patent Literature 1 is directly connected to the article support member at the center of the cover member in the width direction (a direction crossing the conveying direction). Thus, the weight of the cover member is supported only at the center of the cover member in the width direction. In other words, the weight of one end of the cover member in the width direction is not supported and thus after an extended period of use in this state, one end of the cover member may curve downward because of the weight of the cover member. This leaves a vertical clearance between the end of the cover member in the width direction and the article support member, so that baggage may be partially dropped or caught in the clearance. Moreover, when the article support member inclines, one end of the cover member in the width direction is pressed from the article support member. This press also may curve downward one end of the cover member in the width direction.

Patent Literature 1 also describes a method of supporting the cover member by means of a support element reinforced with a rib, as a supporting method of the cover member. However, this method also requires the support element in addition to the cover member, as a structure for filling a clearance between the article support members. This increases the number of components and the cost of constructing conveyor equipment. If a rib is additionally mounted on the cover member by welding in the absence of the support element, heat for welding may warp the cover member toward the mounting surface of the rib, that is, the underside of the cover member, causing a difference in shape between the cover member and the article support member. This leaves a clearance between the cover member and the article support member.

SUMMARY OF THE INVENTION

An object of the present invention is to provide a conveyor apparatus that prevents a clearance from being vertically left between an article support and one end of an infilling member in the width direction while suppressing the cost of constructing conveyor equipment without the need for a support element, the infilling member filling a gap between the article supports arranged on a conveying path.

In order to solve the problem, a conveyor apparatus according to an embodiment of the present invention is a conveyor apparatus for conveying articles, including: a plurality of traveling units that travel in series along a conveying path for the articles; and a plurality of article supports that have article support surfaces for supporting the articles and that are caused to travel on the conveying path by the respective traveling units, the conveyor apparatus further including infilling members provided for the respective article supports, the infilling member filling a clearance between the article supports longitudinally adjacent to each other in the conveying path, in which the article support has a support contact part on the rear end along the conveying path, the infilling member has an infilling contact part on the front end along the conveying path, the infilling contact part being in contact with the support contact part, and the infilling contact part has a larger curvature than the support contact part.

With this configuration, a difference in curvature between the infilling contact part and the support contact part allows the infilling contact portion of the infilling member to securely come into contact with the support contact part of the article support, vertically leaving no clearance on one end of the infilling member in the width direction. Furthermore, even if one end of the infilling member in the width direction curves downward (the curvature decreases), the curvature of the infilling contact part is brought closer to that of the support contact part. Thus, the infilling contact part is more securely brought into contact with the support contact part, vertically leaving no clearance. Similarly, even if a rib is additionally attached to the infilling contact part of the infilling member by welding and thus the infilling contact part is slightly warped downward (the curvature decreases), the curvature of the infilling contact part is brought closer to that of the support contact part, vertically leaving no clearance.

In addition to the configuration, the conveyor apparatus according to the embodiment the present invention may further include an urging member that urges the infilling contact part of the infilling member to the support contact part of the article support, in which the infilling contact part is made of a flexible material, and the infilling contact part may be urged to the support contact part by the urging member so as to come into contact with the support contact part while being bent along the shape of the support contact part.

With this configuration, even if the infilling contact part and the support contact part have different shapes because of a difference in curvature between the infilling contact part and the support contact part, the urging member urges the infilling contact part to the support contact part so as to shape the infilling contact part along the support contact part, thereby completely filling a clearance between the infilling contact part and the support contact part.

In addition to the configuration, the conveyor apparatus according to the embodiment of the present invention may be configured such that the infilling contact part of the infilling member is made of an elastic material and the infilling contact part may be brought into contact with the support contact part by the elasticity of the infilling contact part while being bent along the shape of the support contact part of the article support.

With this configuration, even if the infilling contact part and the support contact part have different shapes because of a difference in curvature between the infilling contact part and the support contact part, the infilling contact part is shaped along the shape of the support contact part by the elasticity of the infilling contact part, thereby completely filling a clearance between the infilling contact part and the support contact part.

In addition to the configuration, in the conveyor apparatus according to the embodiment of the present invention, the infilling member may be formed such that the curvature of the infilling contact part of the infilling member increases toward one end of the infilling member.

With this configuration, the curvature of the infilling contact part increases toward the vicinity of one end of the infilling member that is likely to curve downward. Thus, even if a part around the center of the infilling contact part does not considerably curve downward while the vicinity of one end of the infilling contact part curves downward to a somewhat high degree, a clearance between the infilling contact part and the support contact part is kept closed. Moreover, for example, when the article support travels on a curve in the conveying path, one end of the infilling contact part may receive a larger load than a part around the center. Also in this case, a curvature on one end is larger than that of a part around the center, thereby keeping the infilling contact part and the support contact part in close contact with each other.

According to the conveyor apparatus of the present invention, a clearance between the article supports is filled with the infilling member and a clearance is prevented from being left between the infilling member and the article support even if both ends of the infilling member in the width direction are curved downward by the weight of the infilling member after an extended period of use of the infilling member. This eliminates the need for changing the infilling members over an extended period. Thus, the number of spare infilling members can be reduced, thereby suppressing the cost of resource acquisition for operating the conveyor apparatus. Moreover, the need for a support element can be eliminated unlike in the related art, thereby inexpensively constructing the conveyor apparatus.

DESCRIPTION OF THE EMBODIMENTS

Schematic Structure of a Conveyor Apparatus

Figure 1:
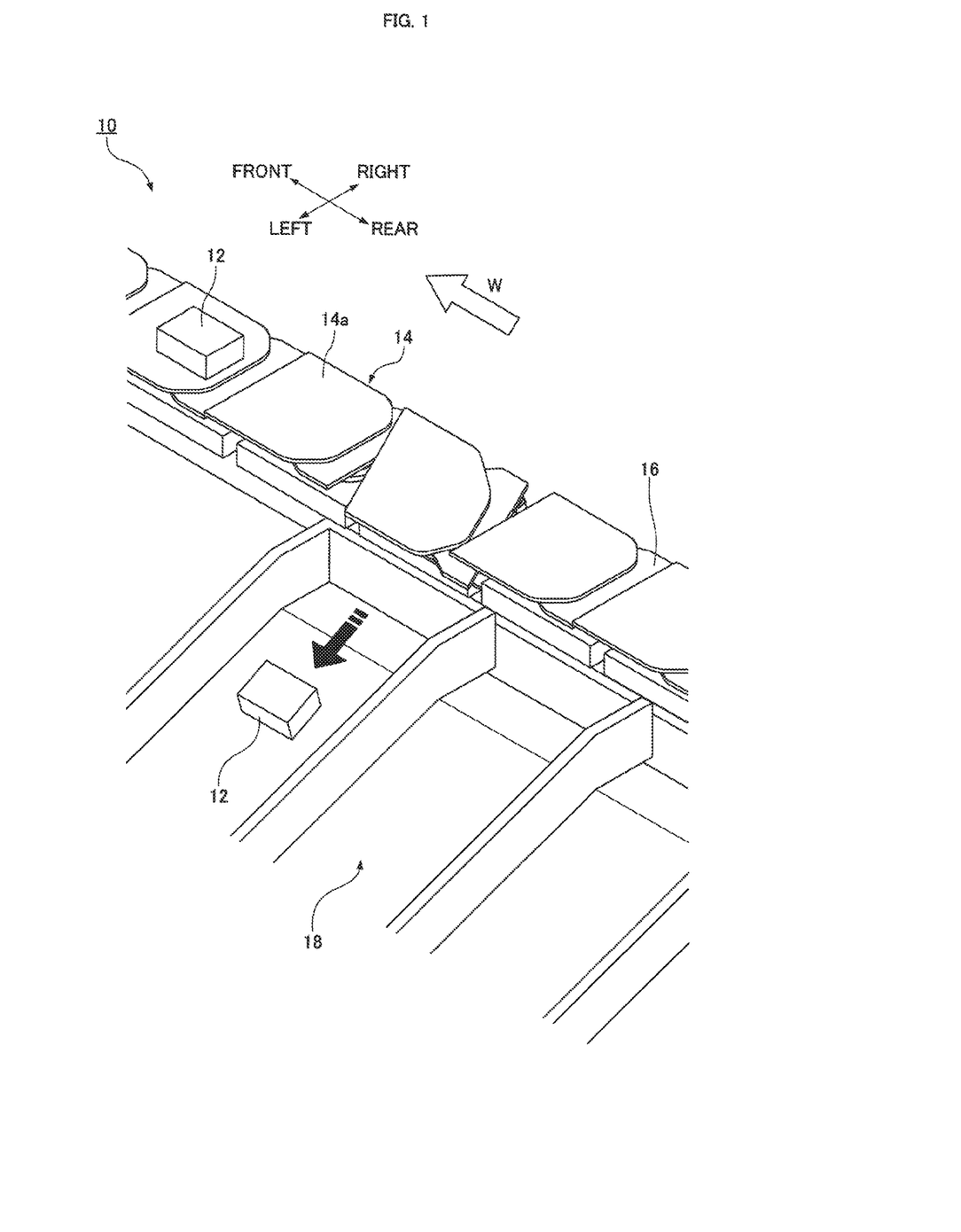
FIG. 1 is a perspective view showing a part of a conveyor apparatus as an example of an embodiment of the present invention.
Figure 4A:
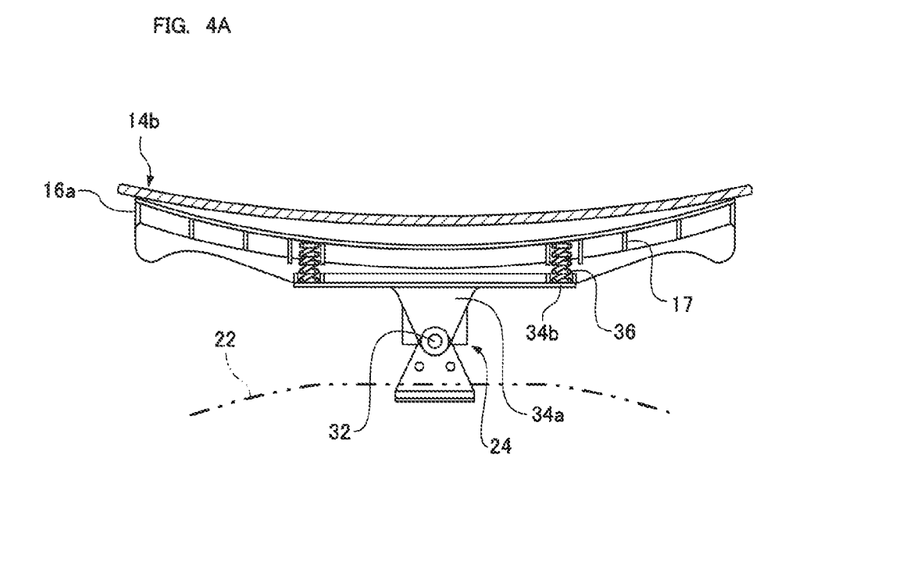
FIG. 4A is a cross-sectional view showing a state immediately before an infill plate is urged by springs, taken along line A-A of FIG. 2.

FIG. 1 shows a part of a conveyor apparatus 10 as an example of an embodiment of the present invention. In the conveyor apparatus 10, an article 12 to be conveyed is placed on a tray 14 serving as an article support and is conveyed in a conveying direction W. In this configuration, a direction along the conveying direction W is referred to as a longitudinal direction and a direction crossing the conveying direction W is referred to as a lateral direction or a width direction. The longitudinal and lateral directions are determined as indicated by arrows in FIG. 1. As shown in FIG. 1, the trays 14 are arranged in series along the conveying direction W. Each of the trays 14 can support the article 12 on an article support surface 14a. As shown in FIG. 4A, the top surface of the tray 14 is curved slightly upward. Thus, when the article 12 is placed on the top surface of the tray 14, the article 12 is moved by the weight of the article 12 to the center of the tray 14 in the width direction along the curve of the top surface of the tray 14. This prevents the article 12 from laterally falling in the width direction of the tray 14, thereby stably supporting the article 12 at the center of the tray 14 in the width direction.

As indicated by a virtual line in FIG. 1, the tray 14 can be laterally inclined with respect to the conveying direction W (FIG. 1 only shows a tray 14 inclined to the left). Thus, the article support surface 14a of the tray 14 can be inclined from a horizontal plane so as to discharge the article 12 into one of a plurality of chutes 18 placed along the conveying direction W. The chutes 18 are connected to the respective destinations. The operation of the conveyor apparatus 10 is controlled so as to discharge the article 12 on the tray 14 into the chute 18 connected to the destination of the article 12.

Moreover, an infill plate 16 serving as an infilling member is provided for each of the trays 14 so as to fill a clearance between the two trays 14 longitudinally arranged (adjacent to each other) along the conveying direction W. This configuration prevents a part or the whole of the article 12 from falling into a clearance between the trays 14. The infill plate 16 is inclined with the corresponding tray 14 when the tray 14 is inclined.

Traveling Unit

Figure 2:
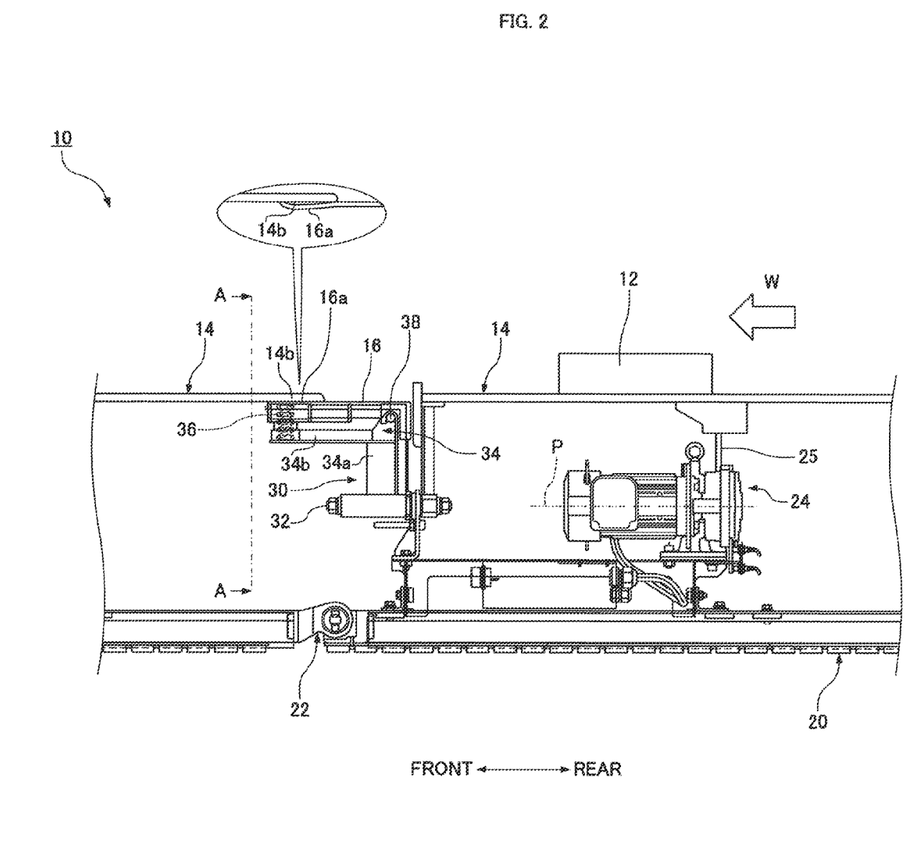
FIG. 2 is a side view showing the conveyor apparatus according to the embodiment.

FIG. 2 is a side view of the conveyor apparatus 10. As shown in FIG. 2, the tray 14 is supported by a traveling unit 20. The traveling unit 20 travels along a rail (not shown in FIG. 2) laid along a conveying path. The entire traveling unit 20 is substantially shaped like a rectangular plate longitudinally extended along the conveying direction W. The traveling units 20 longitudinally arranged (adjacent to each other) along the conveying direction W are connected to each other via a coupler 22. The coupler 22 is not specifically illustrated. The bodies of the connected traveling units 20 can vertically and horizontally pivot about the coupler 22. Thus, even if the traveling units 20 travel along curves or ups and downs in the conveying path, the line of traveling units 20 can travel along the shape of the conveying path.

Moreover, the traveling unit 20 supports the tray 14 via an inclining part 24. The inclining part 24 rotates a tray support member 25, which vertically extends so as to support the tray 14, by a driving force of a motor 26 and the like around an inclination axis P parallel to the conveying direction W, thereby inclining the tray 14 so as to incline the article support surface 14*a* of the tray 14 from the horizontal plane.

Plate Support Part

Furthermore, a plate support part 30 supporting the infill plate 16 is provided at the front of the traveling unit 20 with respect to the conveying direction W. The plate support part 30 includes a plate inclining shaft 32 (infilling member inclining shaft) supported by the traveling unit 20 and a plate support 34 connected to the plate inclining shaft 32.

The plate inclining shaft 32 is a long member axially extended along the conveying direction W. The plate inclining shaft 32 is extended coaxially with the inclination axis P of the tray 14. Moreover, the plate inclining shaft 32 can rotate about the axial direction. If the infill plate 16 is inclined, the plate support 34 and the plate inclining shaft 32 both rotate along the axial direction of the plate inclining shaft 32 according to the inclination.

The plate support 34 includes a vertical part 34*a* that is connected to the plate inclining shaft 32 and is vertically extended upward, and front extending parts 34*b* that extend forward from the vertical part 34*a* in the conveying direction W. Moreover, a swing bar 38 is supported on the upper end of the vertical part 34*a* and the rear ends of the front extending parts 34*b* so as to form a swinging shaft laterally extending with respect to the conveying direction W. Furthermore, springs 36 vertically extending upward are respectively supported on the front sides of the front extending parts 34*b*. The infill plate 16 is supported from below by the swing bar 38 and the springs 36.

Infill Plate

The infill plate 16 can be made of, for example, injection-molded synthetic resin. As indicated by broken lines in the plan view of FIG. 3, the infill plate 16 supported by the plate support part 30 is as large as the tray 14 in the width direction (a direction crossing the conveying direction W) and is longer than a clearance between the trays 14 in the longitudinal direction along the conveying direction W. The infill plate 16 is longer than the clearance in the longitudinal direction and thus extends from the front end of the rear tray 14 (the tray 14 indicated by a solid line on the right side in FIG. 3) to the bottom of the rear of the front tray 14 (the tray 14 indicated by a virtual line on the left side in FIG. 3), thereby completely filling the clearance in the longitudinal direction. As will be discussed below, a part of the infill plate 16 is disposed under the rear of the front tray 14 (a part overlapping the tray 14 in plan view) and the part will be called a plate contact part 16*a* (infilling contact part). Moreover, a part of the tray 14 overlaps the plate contact part 16*a* (the rear end extended along the conveying path or the conveying direction W) and the part will be called a tray contact part 14*b* (support contact part).

Figure 3:
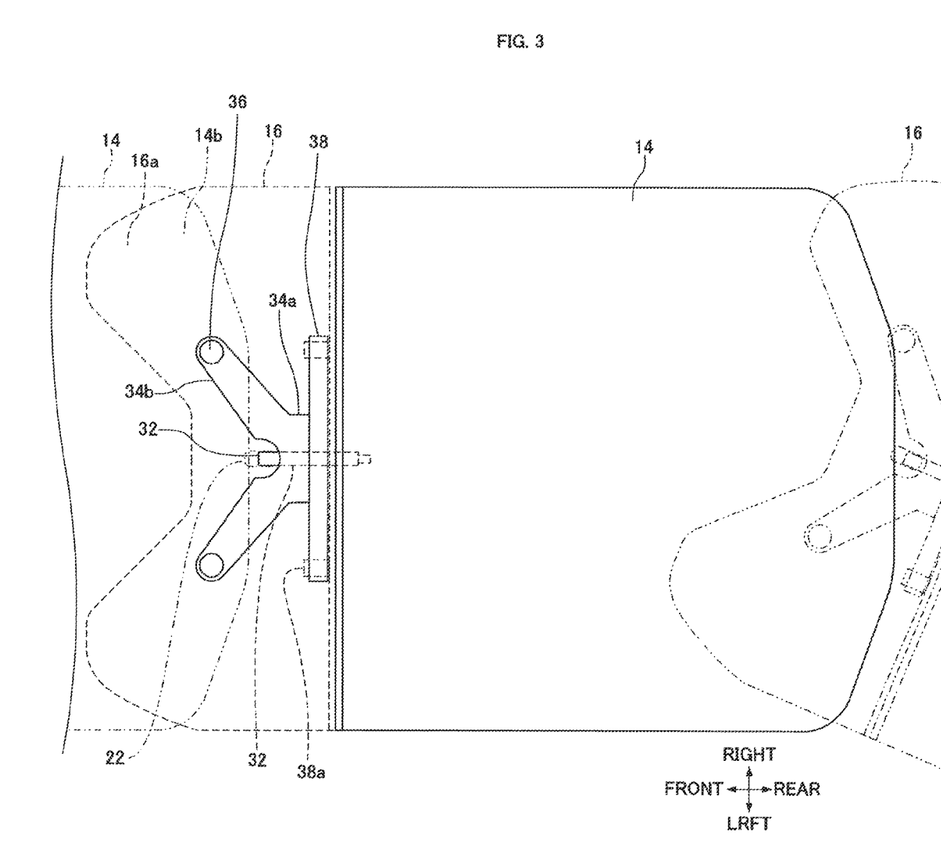
FIG. 3 is a plan view showing a plate support part for the conveyor apparatus according to the embodiment.

When the trays 14 travel on a curve, the traveling directions of the tray 14 and the infill plate 16 intersect each other as indicated on the right end of FIG. 3, so that the vertically overlapping area of the tray 14 and the infill plate 16 is small on one of the right and left sides (the right side in FIG. 3) and is large on the other side (the left side in FIG. 3) unlike when traveling on a linear part. Also in this case, in order to completely close the clearance, the right and left parts of the infill plate 16 in the width direction have larger longitudinal dimensions than the center of the infill plate 16 in the width direction.

As shown in a perspective view in FIG. 5, the bottom of the front side (plate contact part 16*a*) of the infill plate 16 is supported from below by the springs 36. Moreover, a bar fitting part 38*a*, e.g., a groove or a hole sized to be fit to the swing bar 38 is provided below the rear side of the infill plate 16 (in this configuration, the bar fitting part 38*a* is a hole). As has been discussed, the swing bar 38 fit into the bar fitting part 38*a* is supported by the plate support part 30. The infill plate 16 can vertically swing around the axis of the swing bar 38.

Figure 4B:
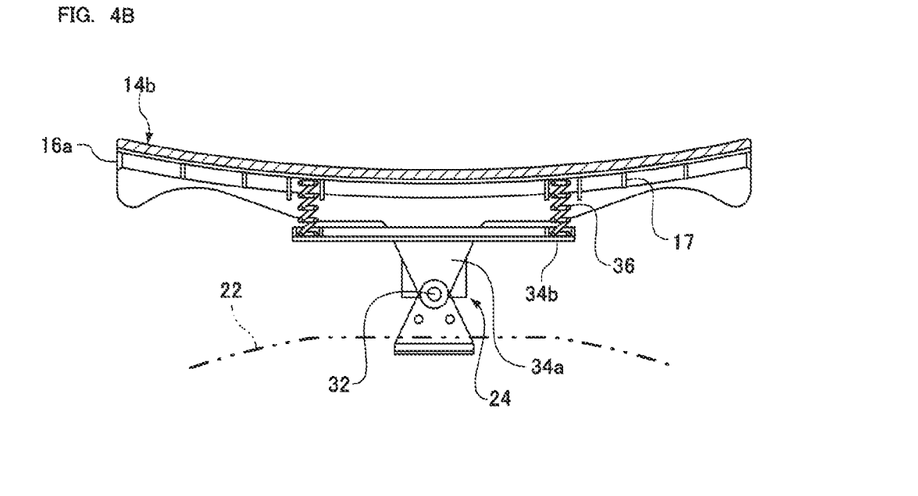
FIG. 4B is a cross-sectional view showing a state after the infill plate is urged by the springs, taken along line A-A of FIG. 2.

As shown in FIG. 4A, when the infill plate 16 is viewed in a direction along line A-A of FIG. 2 (the front side along the conveying direction W), the plate contact part 16*a* located at the front of the infill plate 16 has a higher degree of upward curving (curvature) than the tray contact part 14*b* located at the rear of the tray 14. In other words, the top surface of the plate contact part 16*a* has a smaller curvature radius than the bottom of the tray contact part 14*b*. Thus, in the absence of urging by the springs 36, the ends (right and left ends) of the top surface of the plate contact part 16*a* in the width direction are in contact with the underside of the tray contact part 14*b* as shown in FIG. 4A; whereas the center of the plate contact part 16*a* in the width direction is not in contact with the tray contact part 14*b*. As will be discussed later, as shown in FIG. 4B, the plate contact part 16*a* in the width direction is entirely brought into contact with the tray contact part 14*b* by being urged with the springs 36.

Spring

Figure 5:
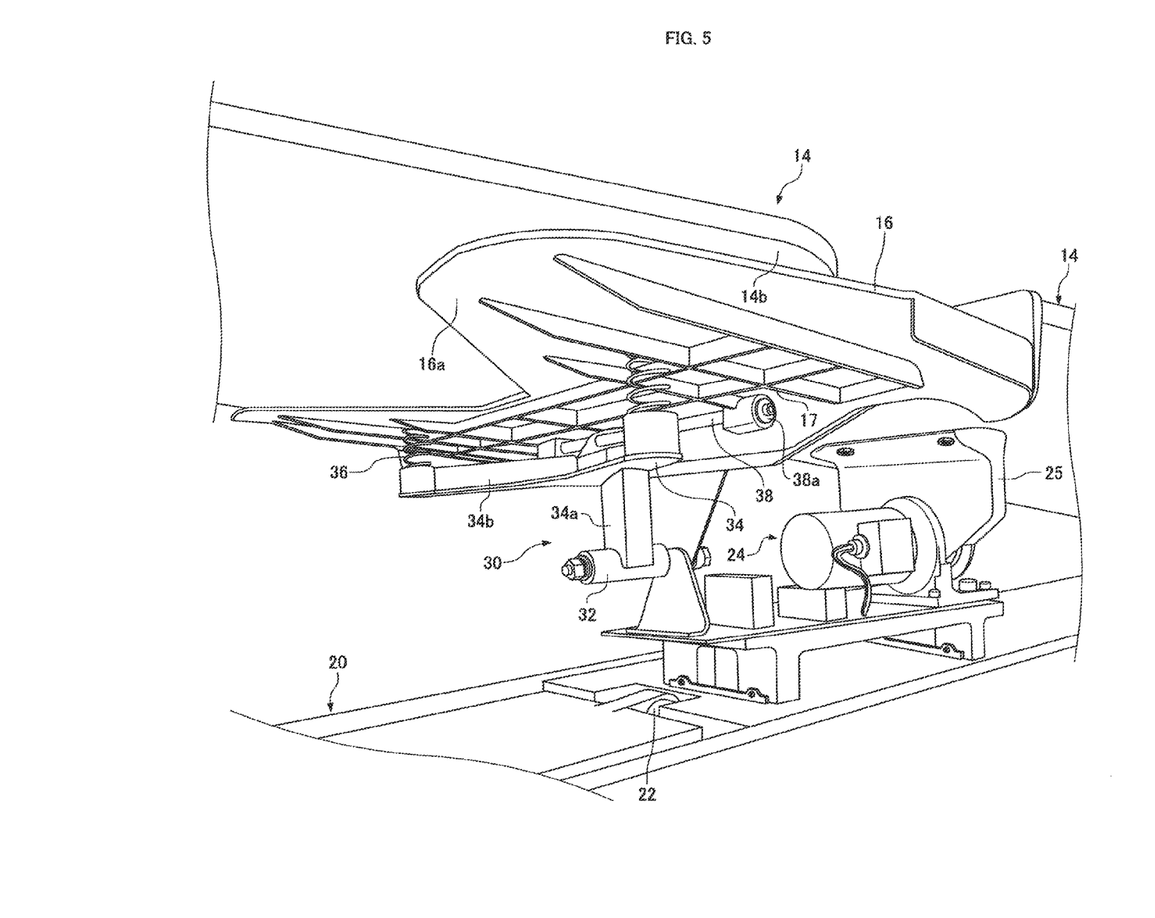
FIG. 5 is a perspective bottom view showing a state around a traveling unit for the conveyor apparatus according to the embodiment.

As shown in FIGS. 3 and 5, the front extending parts 34*b* of the plate support 34 are branches extending forward to the right and left. The two branch front extending parts 34*b* support the respective springs 36 on the front ends. Thus, the two springs 36 are respectively disposed at two points separated in the width direction under the plate contact part 16*a* and support the plate contact part 16*a*.

When the spring 36 acting as an urging member is extended or compressed (displaced) from a length in a state of equilibrium (an external force is not applied), the spring 36 generates a force for restoration to the state of equilibrium, that is, a restoring force by the elasticity of the spring 36. The spring 36 in the state of equilibrium is designed to be longer than a distance from a position where the plate support part 30 in FIGS. 2, 4A supports the spring 36 (specifically, the top surface of the front extending part 34*b* of the plate support 34) to the bottom of the tray contact part 14*b*. Thus, as shown in FIG. 4A, the springs 36 are compressed from a state of equilibrium in a state in which the center of the plate contact part 16*a* in the width direction is separated from the tray contact part 14*b* and the upper ends of the springs 36 are in contact with the underside of the central part of the plate contact part 16*a* in the width direction. Thus, the plate contact part 16*a* is likely to extend upward to the tray contact part 14*b*. The springs 36 extending upward press upward the central part of the plate contact part 16*a* in the width direction while the upper ends of the springs 36 are in contact with the plate contact part 16*a*. At this point, if the infill plate 16 is made of a flexible material (e.g., injection-molded synthetic resin), when the plate contact part 16*a* of the infill plate 16 is pressed to the tray contact part 14*b* by the springs 36, the plate contact part 16*a* is bent along the shape of the underside of the tray contact part 14*b* by the flexibility of the plate contact part 16*a*. Finally, as shown in FIG. 4B, the top surface of the plate contact part 16*a* is in contact with the underside of the tray contact part 14*b*, so that the plate contact part 16*a* and the tray contact part 14*b* are in contact with each other over the width direction.

As has been discussed, the plate contact part 16*a* of the infill plate 16 is in contact with the tray contact part 14*b* of the tray 14, allowing the infill plate 16 to follow the movement of the tray 14. For example, when the tray 14 laterally inclines, the infill plate 16 is inclined with the tray 14 while being kept in contact with the tray 14.

In the conveyor apparatus 10 of the present embodiment, the plate contact part 16a serving as the infilling contact part has a larger curvature than the tray contact part 14b serving as the support contact part (the infill plate 16 has a smaller curvature radius than the tray 14). Thus, the ends of the plate contact part 16a in the width direction come into contact with the underside of the tray contact part 14b, vertically leaving no clearance on the ends in the width direction.

Moreover, the tray contact part 14b is urged to the plate contact part 16a by the springs 36 and the tray contact part 14b is in contact with the plate contact part 16a while being bent along the shape of the plate contact part 16a. Thus, the plate contact part 16a is brought into close contact with the plate contact part 16a at the center of the plate contact part 16a in the width direction as well as on the ends of the plate contact part 16a in the width direction, vertically leaving no clearance over the width direction.

Furthermore, before the contact part is bent by urging, the upward curvature of the plate contact part 16a is larger than that of the tray contact part 14b (the plate contact part 16a has a smaller curvature radius than the tray contact part 14b). Thus, even if the ends of the infill plate 16 in the width direction are slightly curved downward by the weight of the infill plate 16 as a result of using the infill plate 16 over an extended period, the curving affects the shape of the plate contact part 16a so as to slightly reduce the upward curvature (increase the curvature radius), thereby bringing the curvature of the plate contact part 16a close to that of the tray contact part 14b. In other words, even if the ends in the width direction are curved downward, the curving does not separate the plate contact part 16a from the tray contact part 14b but brings the shape of the plate contact part 16a close to that of the tray contact part 14b. Thus, even if the ends of the plate contact part 16a in the width direction are slightly curved downward, a clearance is not left between the plate contact part 16a and the tray contact part 14b. Similarly, even if the ends of the plate contact part 16a in the width direction are slightly curved downward as a result of laterally inclining the tray 14 many times so as to press down the ends of the plate contact part 16a in the lateral direction (width direction) many times, a clearance is not left between the plate contact part 16a and the tray contact part 14b. Thus, even if the infill plate 16 is made of a material, e.g., resin that is likely to be deformed over an extended period of use, a clearance is not left between the infill plate 16 and the tray 14 by some deformation, thereby keeping normal functions for a long time.

The infill plate 16 may curve downward to the front in the traveling direction (to the front end along the conveying path) as well as to the right and left in the width direction. In order to prevent a clearance from being vertically left between the tray 14 and the infill plate 16 even if the infill plate 16 curves downward to the front, as schematically illustrated in the balloon of FIG. 2, the curvature of the front side of the plate contact part 16a is preferably somewhat larger than that of the tray contact part 14b (For understanding, the curvature of the plate contact part 16a is larger than an actual curvature in the balloon of FIG. 2). In other words, the curvature of the plate contact part 16a is desirably larger than that of the tray contact part 14b when viewed not only in the traveling direction (line A-A of FIG. 2) as shown in FIG. 4A but also from the side (in a direction crossing the traveling direction) as indicated in the balloon of FIG. 2. If the infill plate 16 is made of injection-molded resin, the infill plate 16 can be formed with curvatures in the width direction and longitudinal direction (bent in various directions) because of quite a high degree of flexibility in shape.

As shown in FIGS. 4A, 4B, and 5, ribs 17 may be provided on the underside of the infill plate 16 so as to increase the strength of the infill plate 16. If the ribs 17 are additionally provided after the infill plate 16 is fabricated without the ribs 17, for example, the ribs 17 formed as separate plate members for the infill plate 16 are attached to the underside of the infill plate 16 by welding. When the ribs 17 are welded to the underside of the infill plate 16, the infill plate 16 is slightly warped downward by heat of welding, and the downward warping affects the plate contact part 16a so as to slightly reduce the upward curvature. Thus, the warping does not separate the plate contact part 16a from the tray contact part 14b but brings the shape of the plate contact part 16a close to the shape of the tray contact part 14b. Thus, even if the plate contact part 16a is slightly warped by welding the ribs 17, a clearance is not left between the plate contact part 16a and the tray contact part 14b.

As has been discussed, according to the conveyor apparatus 10 of the present embodiment, a clearance between the trays 14 is filled with the infill plate 16 and a clearance between the infill plate 16 and the tray 14 is prevented from being left even if both ends of the infill plate 16 in the width direction are curved downward as a result of using the infill plate 16 for an extended period or repeatedly inclining the tray 14 in the lateral direction. This eliminates the need for exchanging the infill plate 16 each time the infill plate 16 is deformed, thereby suppressing the cost of resource acquisition for operating the conveyor apparatus 10. Moreover, even if the ribs 17 are welded to the infill plate 16 later, a clearance is not left between the infill plate 16 and the tray 14 by the warp of the infill plate 16, thereby increasing the strength of the infill plate 16 later. For example, another method may be used as follows: a load to the infill plate 16 is first checked by a test run on the conveyor apparatus 10 with the infill plate 16 not provided with the ribs 17, and then the ribs 17 are welded later according to desired strength.

In the present embodiment, the infill plate 16 is made of a flexible material, e.g., synthetic resin and the plate contact part 16a of the infill plate 16 is urged by the springs 36 as shown in FIG. 4B, so that the plate contact part 16a is bent along the shape of the tray contact part 14b. The plate contact part 16a may be made of a material such as wood that is not so flexible, so that the plate contact part 16a is not bent along the shape of the tray contact part 14b. In this case, the plate contact part 16a is not bent and thus as shown in FIG. 4A, the center of the plate contact part 16a in the width direction is separated from the tray contact part 14b. If the plate contact part 16a of the infill plate 16 has a different shape from the other part (rear part) of the infill plate 16, the article 12 is prevented from partially falling between the tray contact part 14b and the center of the plate contact part 16a in the width direction. For example, if a step is provided between the plate contact part 16a of the infill plate 16 and the other rear part of the infill plate 16 and the rear end of the tray 14 is brought into contact with the perpendicular face of the step, a clearance is not left between the rear end of the tray 14 and the infill plate 16. Thus, the article 12 does not partially fall into a clearance between the tray contact part 14b and the center of the plate contact part 16a in the width direction. Needless to say, if the infill plate 16 is made of a flexible material, a step is not necessary between the plate contact part 16a and the other part and thus the top surface of the infill plate 16 may be entirely smoothed.

In the present embodiment, it is assumed that the entire infill plate 16 is made of a flexible material (e.g., injection-molded synthetic resin). Only the plate contact part 16a of the infill plate 16 may be flexible. For example, if the infill plate 16 is made of synthetic resin, the plate contact part 16a may have a small thickness and the other part may have a large thickness, so that the plate contact part 16a is likely to be bent while the other part is not easily bent.

In the present embodiment, as shown in FIG. 3, the two springs 36 are provided in the width direction. Three or more springs may be provided according to the sizes and shapes of the tray 14 and the infill plate 16. If the tray 14 and the infill plate 16 are extremely large in size, a load may be unevenly applied to the overall infill plate 16 by the elastic force of the two springs 36. The load can be evenly applied to the overall infill plate 16 by increasing the number of springs 36. If the tray 14 and the infill plate 16 are small in size, a load applied to the overall infill plate 16 is not so uneven even in the case of the single spring 36. Thus, the number of components may be reduced by placing the single spring 36, for example, under the center of the plate contact part 16a of the infill plate 16 in the width direction.

Furthermore, in the present embodiment, the springs 36 shown in FIG. 5 are used as urging members for urging the plate contact part 16a to the tray contact part 14b. Any member may be used as long as the plate contact part 16a is always pressed to the tray contact part 14b. For example, the spring 36 may be replaced with a restoring force member, e.g., a rubber cylinder or an air cylinder. The restoring force member generates a restoring force for restoration to a state of equilibrium according to a displacement from a state where an external force is not applied (a state of equilibrium). Even if a restoring force member other than the springs 36 is used, the restoring force member may be disposed so as to apply a restoring force in a direction that presses the plate contact part 16a to the tray contact part 14b, so that the infill plate 16 moves according to a movement of the tray 14 and the plate contact part 16a bends along the shape of the tray contact part 14b.

In the present embodiment, as shown in FIG. 5, the springs 36 are disposed under the plate contact part 16a so as to urge the plate contact part 16a to the tray contact part 14b. The springs 36 may be replaced with the infill plate 16 (particularly the plate contact part 16a) made of an elastic material, e.g., rubber, so that the plate contact part 16a is urged to the tray contact part 14b by the elasticity of the plate contact part 16a and is brought into contact with the tray contact part 14b while being bent along the shape of the tray contact part 14b. With this configuration, the plate contact part 16a can be urged to the tray contact part 14b without the springs 36. This eliminates the need for preparing the springs 36 and reduces the number of kinds of components constituting the conveyor apparatus 10. Thus, the cost of component acquisition can be lowered and the number of spare parts to be kept for maintenance can be reduced. Moreover, the springs 36 do not need to be disposed and thus the process of assembly of the conveyor apparatus 10 can be simplified. This can reduce the initial cost of constructing the conveyor apparatus 10 and the maintenance cost.

In the present embodiment, as shown in FIG. 4A, the curvature of the plate contact part 16a is substantially constant in the width direction. Actually, a point near one end of the plate contact part 16a in the width direction is more likely to curve downward than a point near the center of the plate contact part 16a in the width direction. Thus, it is desirable to form the infill plate 16 so as to gradually and continuously increase the curvature toward the ends of the plate contact part 16a (gradually reduce the curvature radius). Furthermore, it is desirable to form the infill plate 16 so as to gradually and continuously increase the curvature toward the front end along the conveying path as well as in the width direction.

REFERENCE SIGNS LIST 10 conveyor apparatus
14 tray
16 infill plate
20 traveling unit
22 coupler
24 inclining part
36 spring
38 swing bar Having described the invention, the following is claimed:

1. A conveyor apparatus for conveying articles, comprising:
   a plurality of traveling units that travel in series along a conveying path for the articles,
   a plurality of article supports that have article support surfaces for supporting the articles and that are caused to travel on the conveying path by the respective traveling units,
   infilling members provided for the respective article supports, each infilling member filling a clearance between the article supports longitudinally adjacent to each other in the conveying path,
   the article support including a support contact part on a rear end of the article support along the conveying path,
   each infilling member including an infilling contact part on a front end of the infilling member along the conveying path, the infilling contact part being in contact with the support contact part,
   the infilling contact part having a larger curvature than the support contact part,
   an urging member that urges the infilling contact part of the infilling member to the support contact part of the article support,
   wherein the infilling contact part is made of a flexible material, and
   the infilling contact part is urged to the support contact part by the urging member so as to come into contact with the support contact part while being bent along a shape of the support contact part.

2. The conveyor apparatus according to claim 1, wherein each infilling member is formed such that the curvature of the infilling contact part of the infilling member increases toward one end of the infilling member.

3. A conveyor apparatus for conveying articles, comprising:
   a plurality of traveling units that travel in series along a conveying path for the articles,
   a plurality of article supports that have article support surfaces for supporting the articles and that are caused to travel on the conveying path by the respective traveling units,
   infilling members provided for the respective article supports, each infilling member filling a clearance between the article supports longitudinally adjacent to each other in the conveying path,
   the article support including a support contact part on a rear end of the article support along the conveying path,
   each infilling member including an infilling contact part on a front end of the infilling member along the conveying path, the infilling contact part being in contact with the support contact part, and the infilling contact part having a larger curvature than the support contact part,
wherein the infilling contact part of each infilling member is made of an elastic material, and the infilling contact part is in contact with the support contact part while being bent along the shape of the support contact part of the article support by elasticity of the infilling contact part.

4. The conveyor apparatus according to claim 3, wherein each infilling member is formed such that the curvature of the infilling contact part of the infilling member increases toward one end of the infilling member.

\* \* \* \* \*